No. 632,267. Patented Sept. 5, 1899.
G. F. JOHNSON.
SHEARS.
(Application filed Mar. 30, 1899.)
(No Model.)
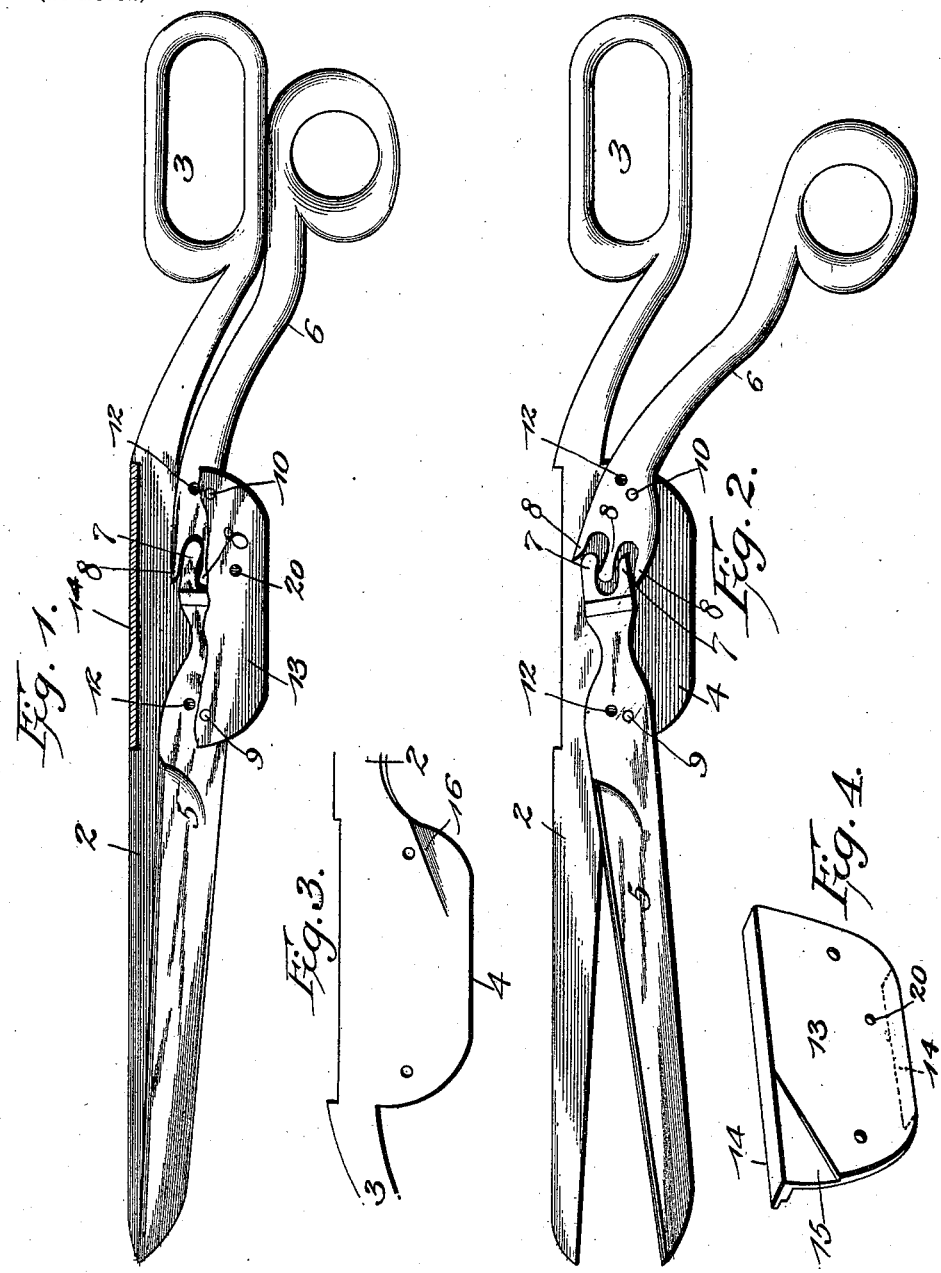

UNITED STATES PATENT OFFICE.

GUSTAF F. JOHNSON, OF SUPERIOR, WISCONSIN, ASSIGNOR OF ONE-THIRD TO J. A. RENÉ, OF SAME PLACE.

SHEARS.

SPECIFICATION forming part of Letters Patent No. 632,267, dated September 5, 1899.

Application filed March 30, 1899. Serial No. 711,120. (No model.)

*To all whom it may concern:*

Be it known that I, GUSTAF F. JOHNSON, a citizen of the United States, residing at Superior, in the county of Douglas and State of Wisconsin, have invented a new and useful Shears, of which the following is a specification.

This invention relates to shears or scissors; and the object of the invention is to provide a simple and effective appliance of this character wherein a large amount of power can be transferred from the handle to what is for the time being the movable blade, and this result can be effected without exertion of undue effort upon the part of the user and can be regulated to meet different conditions of work.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a side elevation of my improved shears with the blades closed and with a portion of the cap-plate removed. Fig. 2 is a similar view with the cap-plate detached and showing the upper blade open. Fig. 3 is a side elevation of the offset, and Fig. 4 is a perspective view of the cap-plate.

Like characters denote like and corresponding parts in each of the several figures of the drawings.

In the drawings the lower or relatively stationary blade of the shears or scissors is denoted by 2, and it has the usual handle 3, made in one piece therewith, and the shank of the blade is provided with an offset or wing 4, near one end of which the upper or swinging blade 5 is pivoted.

The upper blade is operated by the handle 6, which is pivoted to the offset 4, near the outer end thereof, and which is adapted to fit against the handle 3 when the blades are closed together.

The movable blade 5 is provided at a point beyond its pivot with two teeth 7, adapted to coöperate with the three teeth 8 at the forward end of the handle 6, and the intermediate member of the three teeth is disposed between the two teeth, while the outer members thereof are adapted to engage the outer faces of said two teeth on the motion of the handle, thereby through the intermeshing teeth to open or close the movable blade. The pivots for the movable blade and for the handle are denoted, respectively, by 9 and 10, and they consist, preferably, of screws in threaded engagement with the offset 4, and the pivot-screws are adapted to enter the diagonally-disposed openings 12, formed, respectively, in the blade and handle. In Fig. 2 the pivot-pins are shown as being disposed in the lowermost openings of the two series; but the blade and the handle can be so shifted as to introduce said pivot-screws into the upper openings, thereby to effect changes in the leverage exerted by the handle or to vary the position of the blade to take up wear in the same, from which it will be evident that both the blade and the operating-handle therefor are adjustably mounted. The lowermost opening in the handle 6 is represented as being nearer the teeth on said handle than the upper or second opening, and when the pivot-screw is introduced in the latter it will be evident that a decreased leverage will be applied, but it will not be of any great extent, as both of the openings are arranged adjacent to the teeth, whereby pressure upon the end of the handle will result in applying increased power to the movable blade.

The blades may be made of any suitable material, and the lower blade will be made narrow and will have an acute point, so as not to elevate the cloth or other material being cut too high from its support. The intermeshing teeth 7 and 8 are protected by the cap-plate 13, which has flanges 14 along its opposite edges and extending laterally therefrom, one of said flanges fitting against the offset 4 and the other flange engaging in a mortise in the under side of the lower blade, the edges of said last-mentioned parts being flush. The plate 13 is held in place by the screws 9 and 10, which join the blade 5 and the handle 6 to the offset 4.

The cap-plate 13 has a recess 15 near the lower forward corner thereof, which is adapted to receive the cloth, and the upper wall of the recess constitutes a shoulder for pressing down upon the cloth to be cut, thereby to let the shears or scissors pass free thereof, and the offset has a recess 16 near the upper forward corner thereof, thereby producing a second shoulder, which is adapted to sustain the edge of the cloth which is being cut off, so as to permit the free forward movement of the shears or scissors.

Shears or scissors constructed as hereinbefore described are efficient in operation, consist of a small number of parts, and the power exerted by the blade is considerable by reason of the increased leverage applied by the handle, although the labor involved in operating the handle is comparatively small.

The cap-plate 13 has a hole 20 over the intermeshing teeth to receive oil for the purpose of lubricating said teeth.

It will be observed that the edges of the intermeshing teeth 7 and 8 touch a straight line and that said teeth are relatively long, so that when the blade and the handle are either or both of them shifted in the manner hereinbefore set forth the teeth will still remain in mesh, whereby the power can be transferred from the handle to the blade.

Changes in the form, proportion, size, and the minor details of construction within the scope of the appended claims may be resorted to without departing from the spirit or sacrificing any of the advantages of this invention.

Having thus described the invention, what I claim is—

1. In a device of the class described, the combination with a fixed blade having a handle, of a movable blade pivoted thereto, a movable handle also pivoted thereto, said movable parts having intermeshing teeth, and means for adjusting the pivotal connections of the movable parts to have fixed positions with respect thereto.

2. In a device of the class specified, the combination with a fixed blade, of a movable blade pivoted thereto and having teeth, a handle also pivoted to the blade and provided with teeth meshing with said first-mentioned teeth, the pivotal connections of the movable parts being adjustable to have fixed positions with respect thereto and a cap-plate for protecting said teeth said cap-plate being secured in place by the pivots that unite the movable blade and its handle to the fixed blade, substantially as described.

3. In a device of the class described, the combination with a fixed blade having a handle, of a movable blade pivoted thereto, a movable handle also pivoted thereto, said movable parts having relatively long intermeshing teeth, the edges of which touch a straight line, and means for adjusting the pivotal connection of the movable parts to have fixed positions with respect thereto.

4. In a device of the class specified, the combination of a fixed blade having an offset, of a movable blade having relatively long teeth and having a series of openings, a handle also pivoted to the blade and provided with relatively long teeth located to mesh with said first-mentioned teeth and also having a series of openings, pivots adapted to pass through the openings in the blade and the handle respectively and to be seated in said offset, and a cap-plate adapted to cover the intermeshing teeth and having an oil-receiving opening adjacent to said teeth, substantially as described.

5. In a device of the class specified, the combination with a fixed blade provided with an offset having a recess near one corner, of a movable blade having relatively long teeth and having a series of openings, a handle also pivoted to the blade and provided with relatively long teeth located to mesh with said first-mentioned teeth and also having a series of openings, pivots adapted to pass through the openings in the blade and the handle respectively and to be seated in said offset, and a cap-plate adapted to cover the intermeshing teeth and having an oil-receiving opening adjacent to said teeth, and said cap-plate having a recess near one corner thereof, substantially as described.

In testimony that I claim the foregoing as my own I have hereto affixed my signature in the presence of two witnesses.

GUSTAF F. JOHNSON.

Witnesses:
HENRY J. JORDAN,
BYRON T. RANDALL.